United States Patent
Xu

(10) Patent No.: US 11,486,182 B2
(45) Date of Patent: Nov. 1, 2022

(54) LINEAR MOTOR FOR SLIDING DOOR

(71) Applicant: ZHONGSHAN OPIKE HARDWARE PRODUCTS CO., LTD, Guangdong (CN)

(72) Inventor: Jiangde Xu, Guangdong (CN)

(73) Assignee: ZHONGSHAN OPIKE HARDWARE PRODUCTS CO., LTD, Zhongshan (CN)

(*) Notice: Subject to any disclaimer, the term of this patent is extended or adjusted under 35 U.S.C. 154(b) by 205 days.

(21) Appl. No.: 16/850,751

(22) Filed: Apr. 16, 2020

(65) Prior Publication Data

US 2020/0240194 A1 Jul. 30, 2020

Related U.S. Application Data

(63) Continuation of application No. PCT/CN2018/107193, filed on Sep. 25, 2018.

(30) Foreign Application Priority Data

Oct. 26, 2017 (CN) .......................... 201711015274.8
Oct. 26, 2017 (CN) .......................... 201721391841.5

(51) Int. Cl.
  *E05F 15/60* (2015.01)
  *H02K 16/04* (2006.01)
  *H02K 41/02* (2006.01)

(52) U.S. Cl.
  CPC .............. *E05F 15/60* (2015.01); *H02K 16/04* (2013.01); *H02K 41/02* (2013.01); *E05Y 2900/132* (2013.01)

(58) Field of Classification Search
  CPC .......... E05F 15/60; H02K 16/04; H02K 41/02
  (Continued)

(56) References Cited

U.S. PATENT DOCUMENTS 5,831,352 A * 11/1998 Takei ..................... H02K 41/03
                                                      310/12.24
7,592,720 B2    9/2009 Busch
                (Continued)

FOREIGN PATENT DOCUMENTS

CN          2844362 Y      12/2006
CN       104832029 A        8/2015
                (Continued)

OTHER PUBLICATIONS

Extended Search Report of Counterpart European Patent Application No. 18871486.9 dated Nov. 6, 2020.
(Continued)

*Primary Examiner* — David Luo

(57) ABSTRACT

The invention relates to a linear motor for a sliding door, comprising a mover assembly, a stator assembly and a controller for controlling the mover assembly to move, the stator assembly is electrically connected with the controller, and comprises two or more stators; the controller is arranged between the two adjacent stators; and end parts of the stators on two sides of the controller are provided with Hall devices. The mover assembly can move on a left side and a right side of the controller, and the moving range is increased. Furthermore, the Hall devices are arranged at the end parts of the stators on the two sides of the controller, the moving range of the mover assembly to the left side and the right side can be further increased, so that the system can adapt to a wider door opening without changing the length of the stator assembly.

13 Claims, 6 Drawing Sheets

(58) Field of Classification Search
USPC .................................. 318/135, 560, 671, 687
See application file for complete search history.

(56) References Cited

U.S. PATENT DOCUMENTS

| | | | |
|---|---|---|---|
| 7,608,949 B2* | 10/2009 | Busch | ..................... E05F 15/60 |
| | | | 310/14 |
| 8,274,183 B2* | 9/2012 | Hufen | ................... H02K 11/215 |
| | | | 310/12.33 |
| 2003/0230941 A1 | 12/2003 | Jacobs | |

FOREIGN PATENT DOCUMENTS

| EP | 2476842 A2 | 7/2012 |
|---|---|---|
| WO | 2017132762 A1 | 8/2017 |

OTHER PUBLICATIONS

Examination Report of Counterpart Indian Patent Application No. 202017016645 dated Nov. 26, 2020.

* cited by examiner

LINEAR MOTOR FOR SLIDING DOOR

CROSS REFERENCE TO RELATED APPLICATIONS

The present application is a Continuation Application of PCT Application No. PCT/CN2018/107193 filed on Sep. 25, 2018, which claims the benefit of Chinese Patent Application Nos. 201711015274.8 and 201721391841.5 filed on Oct. 26, 2017. All the above are hereby incorporated by reference. the contents of which are incorporated herein by reference in their entirety.

FIELD OF THE INVENTION

The present invention relates to a stator assembly, in particular to a linear motor for a sliding door.

BACKGROUND OF THE INVENTION

Traditional linear devices or systems adopt rotary motors, and intermediate conversion devices (such as chains, wire ropes, transmission belts, racks or screw rods) are needed to convert rotary motion into linear motion. Since the devices or systems are provided with intermediate conversion devices, the entire drive system has disadvantages such as large size, low efficiency and difficult maintenance. At present, electric doors on the market are generally driven by rotating stator assembly, and are pulled by gears and racks, or worm gears and worms, or sprocket wheels and chains, or friction clutches or wire ropes. During the transmission, a process of converting rotary motion into linear motion exists, the structure is complex, and abrasion and failures are liable to occur. The patent CN2844362Y discloses a linear motor-driven automatic door, a linear motor is used as a driving mechanism which directly generates linear motion without an intermediate conversion transmission device, thus, the system structure is simpler, and noise, abrasion and the like caused by mechanical transmission can be avoided. The linear motor-driven automatic door has obvious progress compared with an ordinary traditional automatic door, but there is still room for improvement. In the above patent, Hall sensors are arranged only at one end of the iron-core coil assembly, the distance between the Hall sensors is only 0.5 time the length of the iron-core coil. The patent has the defect that once the length of the iron-core coil is determined, the positions of the Hall sensors are also determined. In this way, the system can only be installed in a door opening with a specific width. That is, the system needs to be customized according to the width of the door opening in actual use, thus being inapplicable to multiple door opening widths. In actual use, door openings are various in width, if the system must be customized specifically for each width, the cost would be greatly increased, and mass production and application cannot be achieved. Therefore, it is particularly necessary to develop a linear motor system capable of adapting to various door opening widths.

SUMMARY OF INVENTION

The present invention aims to overcome the defects in the prior art, and provide a linear motor for a sliding door. The linear motor is novel in design, reasonable in structure and applicable to various door opening widths.

In order to solve the above technical problems, a technical solution provided by the present invention is as follows:

a linear motor for a sliding door comprises a mover assembly, a stator assembly and a controller for controlling the mover assembly to move; the stator assembly is electrically connected with the controller; the stator assembly comprises two or more stators; and the controller is arranged between two adjacent stators; and end parts of the stators on two sides of the controller are provided with Hall devices.

Further, the Hall devices are arranged at ends, away from the controller, of the stators.

Further, the Hall devices are arranged at two ends of the controller respectively.

The Hall devices arranged at the two ends of the controller are combined with the Hall devices arranged at the ends of the stators to form a detection mechanism for detecting the displacement of the mover assembly, so that a more accurate detection effect can be achieved, and the movement of the mover assembly can be conveniently and precisely controlled by the controller.

Further, the stators and the controller are independent components, and pluggable terminals are arranged at two ends of the stators and the controller respectively, and the stators and the controller are electrically connected through the pluggable terminals.

Further, a first pluggable terminal is arranged at two ends of the controller respectively, a second pluggable terminal is arranged at one end of the stators, and the first pluggable terminal is directly connected with the second pluggable terminal.

Further, the first pluggable terminal is provided with a first connecting part and a second connecting part, the first connecting part is provided with a first jack array, the second connecting part is provided with a terminal housing, the terminal housing is internally provided with an accommodating through-hole, an convex insertion block is arranged on part, close to an outer side, of the terminal housing, and the accommodating through-hole allows the jack array to pass through; and the second pluggable terminal is provided with a plug array matched with the jack array, and a slot matched with the insertion block.

Further, a hook is arranged above the jack array, and a clamping slot is formed in part, close to an outer side, of upper end of the terminal housing in a downward recessing manner, and an elastic clamping member is arranged at upper end of the second pluggable terminal; a bottom slot is formed in bottom of the elastic clamping member in an inward recessing manner; and the hook is clamped to the bottom slot of the elastic clamping member in the clamping slot after passing through the terminal housing.

Further, the linear motor for the sliding door also comprises a power supply and/or a reserved junction box, the power supply and/or the reserved junction box are/is independent components, and pluggable terminals are arranged at two ends of the power supply and/or the reserved junction box.

Further, the pluggable terminals of the power supply are electrically connected with the stators or the controller through wires with plugs, and/or the pluggable terminals of the reserved junction box are electrically connected with the stators or the controller through wires with plugs.

Further, the sliding door is provided with a section bar, the section bar is internally divided into two parts in a vertical direction, and the stator assembly, the controller, the reserved junction box and the power supply which are connected end to end are installed inside one part of the section bar.

Further, the mover assembly is provided with a wheel set and installed inside the other part of the section bar, and is opposite to the stator assembly vertically, and the mover assembly slides in the section bar through the wheel set.

Further, both left and right sides of the mover assembly is provided with wheel sets, and the section bar is internally provided with ribs matched with the wheel set.

The linear motor for the sliding door has the beneficial effects as follows:

By arranging the controller between the two adjacent stators, the mover assembly can move on both left and right sides of the controller, so that the moving range of the mover assembly is increased. Further, the Hall devices are arranged at the end parts of the stators on the two sides of the controller, when the mover assembly moves rightwards, the left end of the mover assembly can move farthest to the corresponding position of the Hall device on the stator on the right side of the controller; and similarly, when the mover assembly moves leftwards, the right end of the mover assembly can move farthest to the corresponding position of the Hall device on the stator on the left side of the controller. In other words, by arranging the Hall devices at the end parts of the stators on the two sides of the controller, the leftward and rightward moving range of the mover assembly can be further increased, thus, a linear motor system is also applicable to a wider door opening without changing the length of the stator assembly. The adaptability of the linear motor system is greatly enhanced. In this way, in actual use, it is not necessary to customize and develop a system for each door opening width, large-scale production can be achieved, and the cost is significantly reduced.

BRIEF DESCRIPTION OF THE DRAWINGS

In order to illustrate the embodiments of the present invention or the prior art more clearly, accompanying drawings used in the description of the embodiments or the prior art will be briefly introduced below. Obviously, the accompanying drawings in the following description are just some embodiments of the present invention. For those of ordinary skill in the art, other accompanying drawings can be obtained according to structures shown in the accompanying drawings without creative work.

Figure 1:
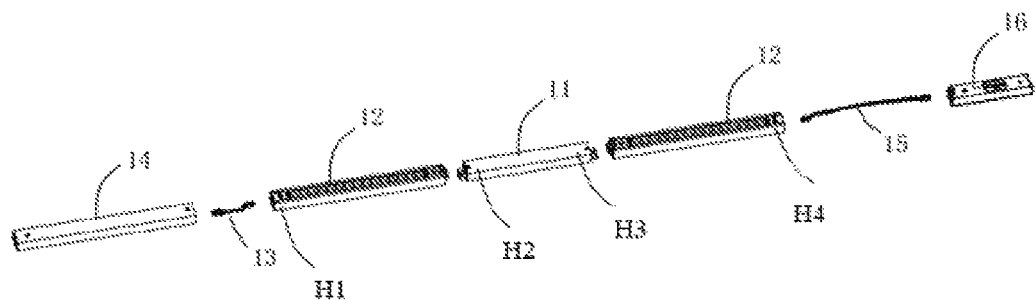
FIG. 1 is a schematic diagram of a multi-segment structure of a linear motor according to an embodiment of the present invention.

DESCRIPTION OF REFERENCE NUMERALS sliding door 100
upper door frame 1
upper component 2
section bar 3
mover assembly 4
sliding door body 5
slide door frame 6
controller 11
first connecting part 111 second connecting part 112 terminal housing 113 circuit board 114
hook 1111 jack array 1112
insertion block 1121 clamping slot 1122 accommodating through-hole 1123
stator 12
third connecting part 121 fourth connecting part 122, 122A and 122B
elastic clamping member 1211 plug array 1212 pressing part 1213
slot 1221 recess 1222
two-position to four-position terminal wire 13
power supply 14
four-position terminal connecting wire 15
reserved junction box 16
Rib 17
wheel set 18
socket 124

DETAILED DESCRIPTION OF THE ILLUSTRATED EMBODIMENTS

The technical solutions in the embodiments of the present invention will be clearly and completely described below with reference to the accompanying drawings. Obviously, the described embodiments are only a part of the embodiments of the present invention, but not all of the embodiments. Based on the embodiments of the present invention, all other embodiments obtained by those of ordinary skill in the art without creative efforts shall fall within the scope of the present invention.

It should be noted that directional indicators (such as up, down, left, right, front, back, outside and inside) in the embodiments of the present invention are only used to explain the relative positional relationship and movement of components in a specific status (as shown in the accompanying drawings), and if the specific status changes, the directional indication changes accordingly.

Figure 2:
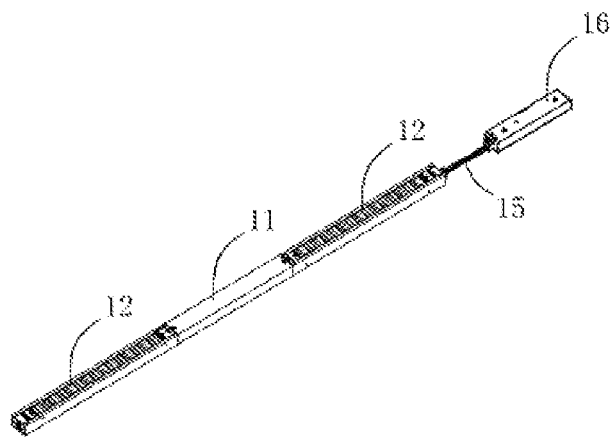
FIG. 2 is an assembly diagram of a multi-segment structure of a linear motor according to an embodiment of the present invention.
Figure 3:
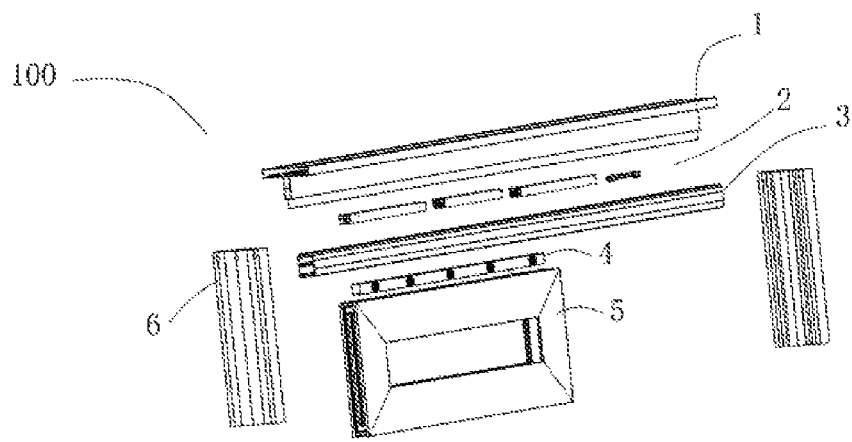
FIG. 3 is an exploded view of a sliding door according to an embodiment of the present invention.
Figure 4:
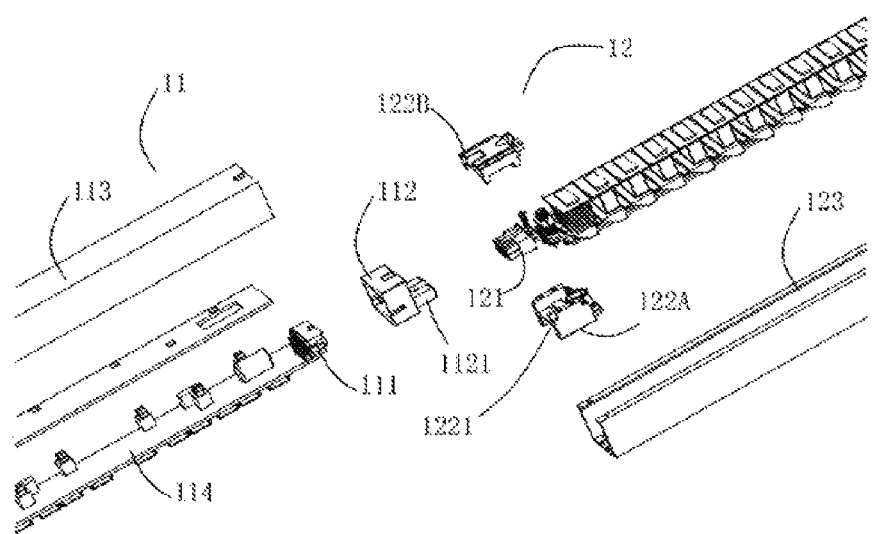
FIG. 4 is an exploded view of a connection structure between stators and a controller according to an embodiment of the present invention.

A linear motor for a sliding door, as shown in FIGS. 1 to 3, comprises a mover assembly 4, a stator assembly and a controller 11, wherein the controller 11 is used for controlling a driving force between the stator assembly and the mover assembly 4 of the linear motor. The stator assembly comprise two or more stators 12, the controller 11 is arranged between the two adjacent stators 12, and end parts of the stators 12 on two sides of the controller 11 are provided with Hall devices. By arranging the controller 11 between the two adjacent stators 12, the mover assembly 4 can move on both left and right sides of the controller 11, and the moving range of the mover assembly 4 is increased.

Further, the Hall devices are arranged at the end parts of the stators 12 on the two sides of the controller 11, and the Hall devices are arranged at ends, away from the controller 11, of the stator 12. In this way, when the mover assembly 4 moves rightwards, the left end of the mover assembly 4 can move farthest to the corresponding position of the Hall device H4 on the stator 12 on the right side of the controller 11; similarly, when the mover assembly 4 moves leftwards, the right end of the mover assembly 4 can move farthest to the corresponding position of the Hall device H1 on the stator 12 on the left side of the controller 11. In other words, by arranging the Hall devices at the end parts of the stators 12 on the two sides of the controller 11, the moving range of the mover assembly 4 to the left and right sides can be further increased, so that a linear motor system is also applicable to a wider door opening without changing the length of the stator assembly, and the adaptability of the system is greatly improved. In this way, in actual use, it is not necessary to customize and develop a system for each door opening width, large-scale production can be achieved, and the cost is significantly reduced. Furthermore, Hall devices H2 and H3 are also arranged at the two ends of the controller 11 respectively, the Hall devices on the controller 11 and the Hall devices on the stators 12 are combined to form a displacement detection mechanism for the mover assembly 4, so that the position of the mover assembly 4 can be accurately detected.

Preferably, in order to realize pluggable connection of the controller 11 and other components, the two ends of the controller 11 are provided with a first pluggable terminal respectively, one end of the stators is provided with a second pluggable terminal, and the first pluggable terminal is directly connected with the second pluggable terminal. By adopting a direct connection manner, there is no connecting wire between the controller 11 and the stators 12, so that the structure is simpler, and the controller 11 and the stators 12 can be installed inside a section bar 3 conveniently. In another embodiment, a wire is also implementable for the pluggable connection between the first pluggable terminal and the second pluggable terminal, and a connecting wire is added between the controller 11 and the stator assembly.

Preferred structures of the first pluggable terminal and the second pluggable terminal are described below. The first pluggable terminal is provided with a first connecting part 111 and a second connecting part 112, as shown in FIGS. 4 to 11. The second pluggable terminal is provided with a third connecting part 121 and a fourth connecting part 122. The first connecting part 111 is provided with a jack array 1112, the second connecting part 112 is provided with a terminal housing 113, the terminal housing 113 is internally provided with an accommodating through-hole 1123, a convex insertion block 1121 is arranged at part, close to an outer side, of the terminal housing 113, and the accommodating through-hole 1123 allows the jack array 1112 to pass through; the third connecting part 121 is provided with a plug array 1212 matched with the jack array 1112, and the fourth connecting part 122 is provided with a slot 1221 matched with the insertion block 1121. That is, the first connecting part 111 is electrically connected with the third connecting part 121, the second connecting part 112 is physically connected with the fourth connecting part 122. The first pluggable terminal and the second pluggable terminal can be detachable, so it is more convenient to assemble the controller 11, and also more convenient for disassembly and check during maintenance.

Figure 5:
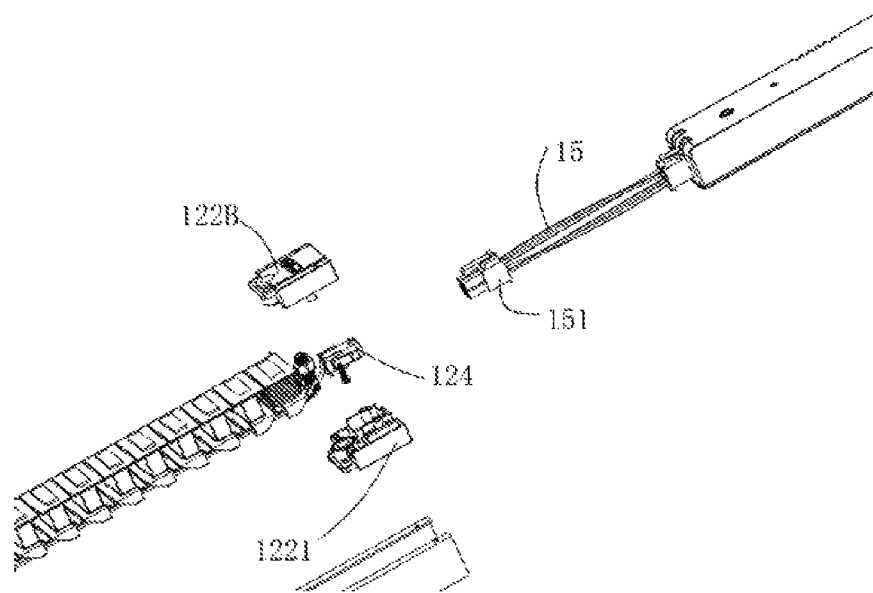
FIG. 5 is an exploded view of a connection structure between stators and a reserved junction box according to an embodiment of the present invention.
Figure 6:
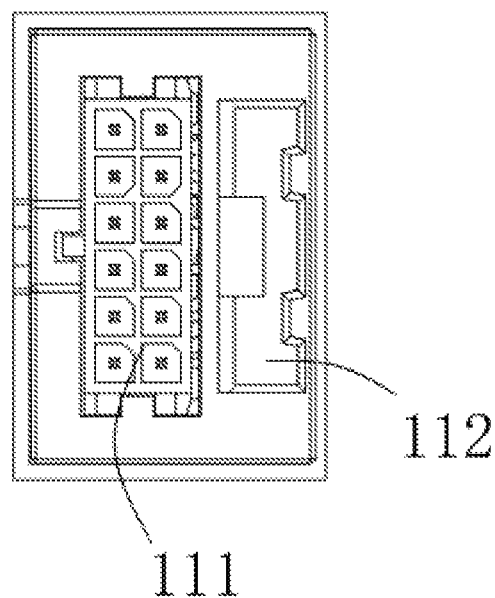
FIG. 6 is a schematic diagram of a pluggable terminal of a controller according to an embodiment of the present invention.
Figure 7:
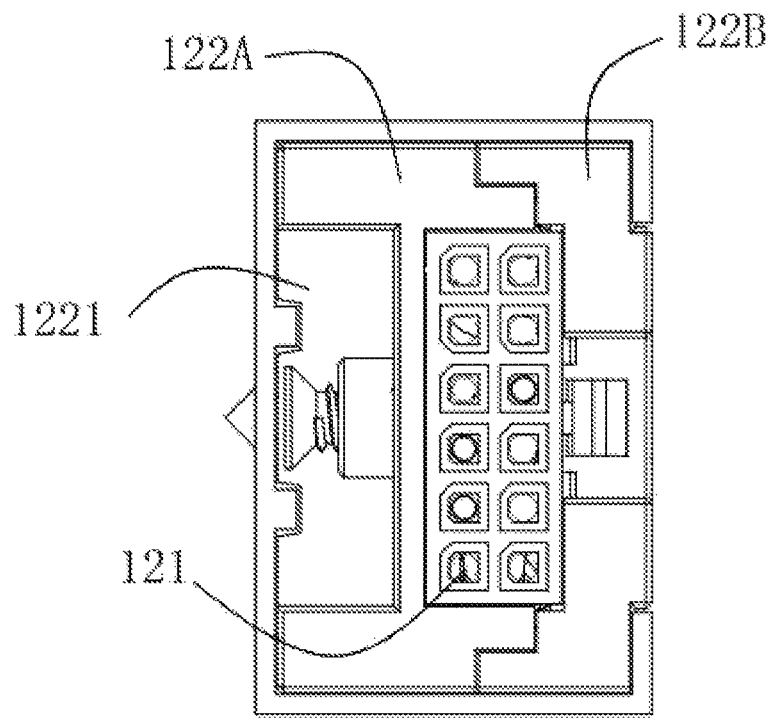
FIG. 7 is a schematic diagram of a pluggable terminal of a stator according to an embodiment of the present invention.

In the present embodiment, as shown in FIG. 5, the fourth connecting part 122 is divided into an upper part 122B and a lower part 122A, after the upper part 122B and the lower part 122A are buckled, a space for the third connecting part 121 to pass through is formed in the middle, and the third connecting part 121 is fixed in the space.

Figure 8:
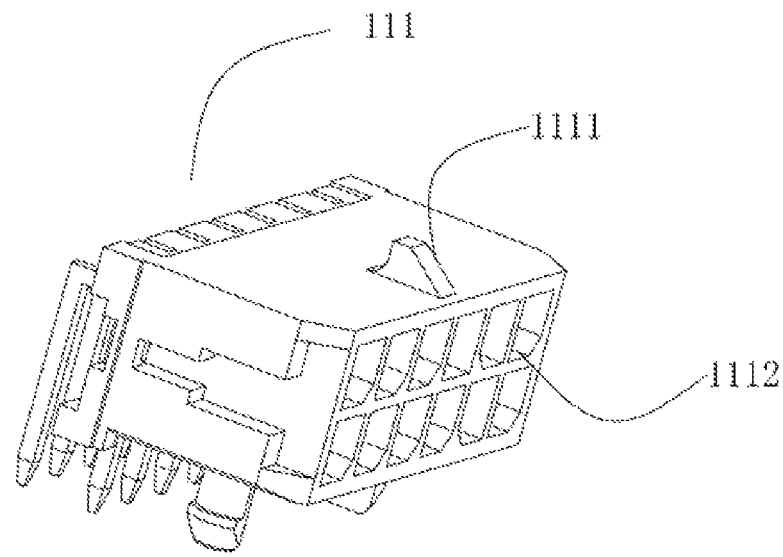
FIG. 8 is a solid diagram of a first connecting part according to an embodiment of the present invention.
Figure 9:
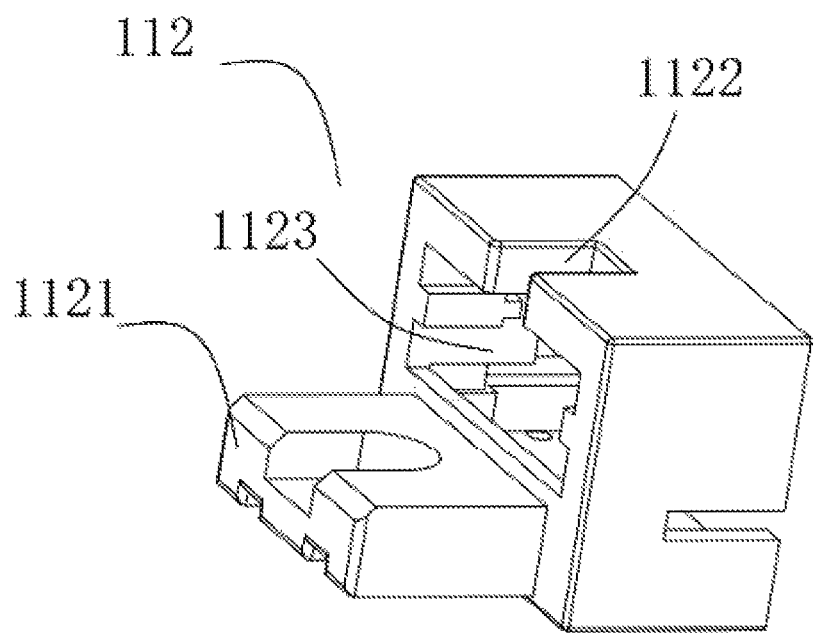
FIG. 9 is a solid diagram of a second connecting part according to an embodiment of the present invention.
Figure 10:
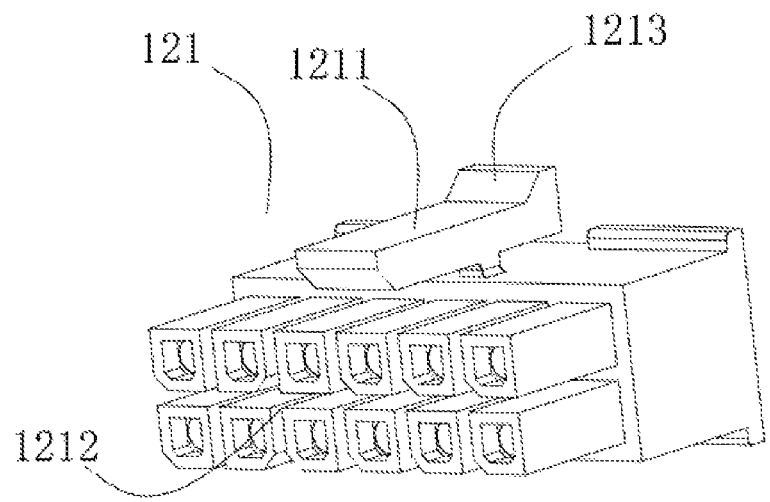
FIG. 10 is a solid diagram of a third connecting part according to an embodiment of the present invention.

Further, as shown in FIGS. 8-10, a hook 1111 is arranged above the jack array 1112, a clamping slot 1122 is formed in part, close to an outer side, of the upper end of the terminal housing 113 in a downward recessing manner, an elastic clamping member 1211 is arranged at the upper end of the plug array 1212, a bottom slot (not shown) is formed in the bottom of the elastic clamping member 1211 in an inward recessing manner, and the hook 1111 is clamped to the bottom slot of the elastic clamping member 1211 in the clamping slot 1122 after passing through the terminal housing 113. Through a cooperative clamping manner of the hook 1111, the clamping slot 1122 and the bottom slot, the first connecting part 111, the second connecting part 112 and the third connecting part 121 are effectively, physically and reliably connected.

Figure 11:
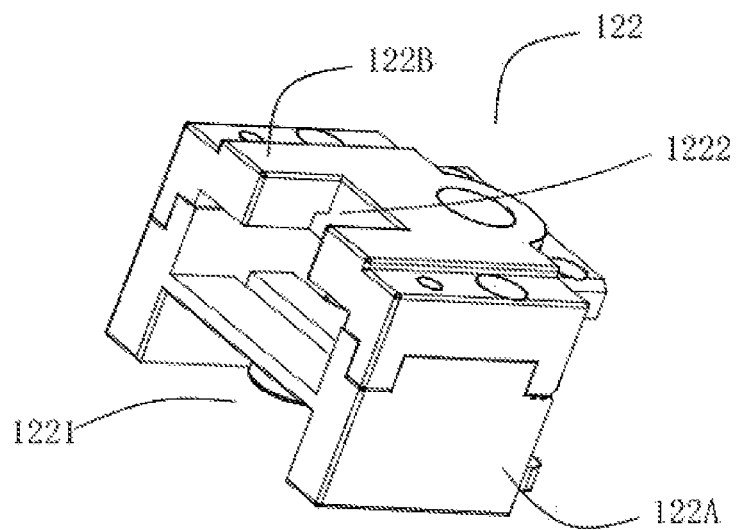
FIG. 11 is a solid diagram of a fourth connecting part according to an embodiment of the present invention.
Figure 12:
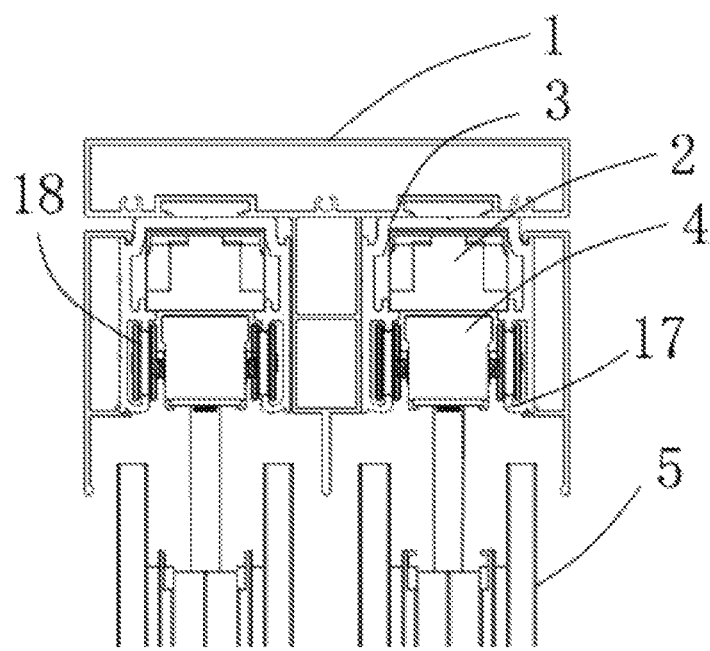
FIG. 12 is a sectional view of a sliding door according to an embodiment of the present invention.

Further, as shown in FIGS. 10-11, a pressing part 1213 is arranged on the upper end of the clamping members 1211. Through the design of the pressing part 1213, the controller 11 and the stators 12 can be conveniently separated. In FIG. 12, the upper end of the fourth connecting part 122 are recessed to form a recess 1222 for at least partially accommodating the elastic clamping member 1211. The elastic clamping member 1211 is hidden in the recess 1222, so that the controller 11 and the stator assembly are on the same plane after being connected, the elastic clamping member 1211 does not protrude to avoid affecting an overall appearance.

Further, in the present embodiment, a multi-segment structure further comprises a power supply 14 and a reserved junction box 16. The power supply 14 and the reserved junction box 16 are also independent components, and pluggable terminals are arranged at two ends of the power supply 14 and the reserved junction box 16 respectively. The power supply 14 and the reserved junction box 16 adopt independent components, and form a multi-segment structure together with the controller 11 and the stator assembly, so that the structure of the linear motor for the sliding door is further simplified. In the embodiment, as shown in FIG. 1, the pluggable terminal of the power supply 14 is electrically connected with the corresponding stator 12 through a two-position to four-position terminal wire 13, and the pluggable terminal of the reserved junction box 16 is electrically connected with the corresponding stator 12 through a four-position terminal connecting wire 15. In addition, the pluggable terminal of the power supply 14 can also be directly connected with the corresponding stator 12, and the pluggable terminal of the reserved junction box 16 can also be directly and electrically connected with the corresponding stator 12. End parts of the power supply 14 and the reserved junction box 16 are in pluggable connection with other components through the pluggable terminals. Wires with plugs or direct connection may be adopted for achieving the pluggable connection manner to form a multi-segment structure comprising the power supply 14 and/or the reserved junction box 16, the controller 11 and the stators 12.

Specifically, as shown in FIG. 5, the pluggable terminal, connected with the reserved junction box 16, of the stator 12 is provided with a fourth connecting part 122 and a socket 124. Similarly, the fourth connecting part 122 is divided into an upper part 122B and a lower part 122A, a middle space formed after buckling the upper part 122B and the lower part 122A is used for fixing the socket 124, and a plug of the four-position terminal connecting wire 15 is connected with the socket 124.

In the present embodiment, wires in the stator 12 are encapsulated in the third connecting part 121 and the socket 124 at the two ends of the stator 12, so that the overall sealing of the stators is good.

In addition, a pluggable terminal on an outer side of the power supply 14 is in pluggable connection with an external power line. In the present invention, power supply and wiring of the entire linear motor are achieved just by connecting the pluggable terminal on the outer side of the power supply 14 with the external power line, and installation is extremely convenient since there is only one external interface.

The sliding door is provided with a section bar 3, the section bar 3 is internally divided into two parts in a vertical direction, and the stator assembly, the controller, the reserved junction box and the power supply which are connected end to end are installed inside a part of the section bar 3.

In a preferred embodiment, a relative installation relationship between the upper component 2 and the mover assembly 4 is further described. When the linear motor is installed on a door body 5, the upper component 2 is of an integral strip shape formed by connecting the power supply 14, the two-position to four-position terminal wire 13, the left stator 12, the controller 11, the right stator 12, the four-position terminal connecting wire 15 and the reserved junction box 16 end to end, which is relatively fixed in upper space of the section bar 3. The mover assembly 4 is provided with a long-strip-shaped housing and internally provided with a magnet bar. Wheels are arranged on two sides outside the housings of the mover assembly 4 to form a wheel set 18. Multiple wheel sets may be arranged at a certain interval in a length direction of the housing of the mover assembly 4. In the present embodiment, the wheel set 18 adopts concave wheels. The mover assembly 4 is inserted into lower space of the section bar 3 together with the wheel set 18 from the end part of the section bar 3 and is opposite to the upper component 2 vertically, as shown in FIG. 12. Four ribs 17 are arranged in the lower space of the section bar 3, wherein the ribs 17 on left and right sides of the bottom of the lower space are formed by bending the bottom edge of the section bar 3 inwards, and the bending direction is vertically upward. The protruding direction of the ribs 17 located in the middle of the section bar 3 is opposite to that of the ribs 17 in the bottom. Therefore, the four ribs are matched with the grooves of the concave wheels, so that the mover assembly 4 slides in the section bar 3 through the wheel set 18.

The mover assembly 4 is connected with the door body 5 of the sliding door, and the above structure can drive the door body 5 to smoothly move left and right.

The wheel set 18 can also adopt flat wheels, and the flat wheels abut against the ribs 17, which can achieve the sliding of the mover assembly 4.

Although the present invention has been described above with reference to some embodiments, various improvements can be made thereto and the components therein can be replaced with equivalents without departing from the scope of the present invention. In particular, as long as there are no structural conflicts, the features in the various embodiments disclosed in the present invention can be combined with each other in any way for use, but for the sake of saving space and resources, the cases of the combinations are not exhaustively described in the specification. Therefore, the present invention is not limited to the specific embodiments disclosed herein, but includes technical solutions falling within the scope of the claims.

The invention claimed is:

1. A linear motor for a sliding door (100), characterized by comprising:
   a mover assembly (4), a stator assembly, and a controller (11) for controlling the mover assembly (4) to move, wherein the stator assembly is electrically connected with the controller (11), the stator assembly comprises two or more stators (12), the controller (11) is arranged between two adjacent stators (12), and end parts of the stators (12) on two sides of the controller (11) are provided with Hall devices;
   the stators (12) and the controller (11) are independent components, two ends of the stators (12) and two ends of the controller (11) are provided with pluggable terminals respectively, and the stators (12) and the controller (11) are electrically connected through the pluggable terminals.

2. The linear motor for the sliding door (100) according to claim 1, characterized in that the Hall devices are arranged at ends, away from the controller (11), of the stators (12).

3. The linear motor for the sliding door (100) according to claim 2, characterized in that the Hall devices are arranged at two ends of the controller (11) respectively.

4. The linear motor for the sliding door (100) according to claim 3, characterized by further comprising a power supply (14) and/or a reserved junction box (16), wherein the power supply (14) and/or the reserved junction box (16) are/is independent components, and two ends of the power supply (14) and/or the reserved junction box (16) are provided with pluggable terminals respectively.

5. The linear motor for the sliding door (100) according to claim 2, characterized by further comprising a power supply (14) and/or a reserved junction box (16), wherein the power supply (14) and/or the reserved junction box (16) are/is independent components, and two ends of the power supply (14) and/or the reserved junction box (16) are provided with pluggable terminals respectively.

6. The linear motor for the sliding door (100) according to claim 1, characterized in that a first pluggable terminal is arranged at the two ends of the controller (11) respectively, a second pluggable terminal is arranged at one end of the stators (12), and the first pluggable terminal is directly connected with the second pluggable terminal.

7. The linear motor for the sliding door (100) according to claim 6, characterized in that the first pluggable terminal is provided with a first connecting part (111) and a second connecting part (112), the first connecting part (111) is provided with a jack array(1112), the second connecting part (112) is provided with a terminal housing(113), the terminal housing (113) is internally provided with an accommodating through-hole(1123), an convex insertion block(1121) is arranged on part, close to an outer side, of the terminal housing(113), and the accommodating through-hole(1123) allows the jack array(1112) to pass through; and the second pluggable terminal is provided with a plug array(1212) matched with the jack array(1112), and a slot(1221) matched with the insertion block(1121).

8. The linear motor for the sliding door (100) according to claim 7, characterized in that a hook (1111) is arranged above the jack array(1112), a clamping slot(1122) is formed in part, close to an outer side, of upper end of the terminal housing(113) in a downward recessing manner, and an elastic clamping member(1211) is arranged at upper end of the second pluggable terminal; a bottom slot is formed in bottom of the elastic clamping member (1211) in an inward recessing manner; and the hook(1111)is clamped to the bottom slot of the elastic clamping member(1211)in the clamping slot(1122)after passing through the terminal housing(113).

9. The linear motor for the sliding door (100) according to claim 1, characterized by further comprising a power supply (14) and/or a reserved junction box (16), wherein the power supply (14) and/or the reserved junction box (16) are/is independent components, and two ends of the power supply (14) and/or the reserved junction box (16) are provided with pluggable terminals respectively.

10. The linear motor for the sliding door (100) according to claim 9, characterized in that the pluggable terminals of the power supply (14) are electrically connected with the stators (12) or the controller (11) through wires with plugs, and/or the pluggable terminals of the reserved junction box (16) are electrically connected with the stators (12) or the controller (11) through wires with plugs.

11. The linear motor for the sliding door (100) according to claim 9, characterized in that the sliding door (100) is provided with a section bar (3), the section bar (3) is internally divided into two parts in a vertical direction, and the stator assembly, the controller (11), the reserved junction box (16) and the power supply (14) which are connected end to end are installed inside one part of the section bar (3).

12. The linear motor for the sliding door (100) according to claim 11, characterized in that the mover assembly (4) is provided with a wheel set (18) and installed inside an other part of the section bar (3), and is opposite to the stator assembly vertically, and the mover assembly (4) slides in the section bar (3) through the wheel set (18).

13. The linear motor for the sliding door (100) according to claim 12, characterized in that the wheel set (18) is arranged on left and sides of the mover assembly (4), and the section bar (3) is internally provided with ribs (17) matched with the wheel set (18).

* * * * *